US005366672A

United States Patent [19]

Albrigo et al.

[11] Patent Number: 5,366,672

[45] Date of Patent: Nov. 22, 1994

[54] METHOD OF FORMING CONCRETE STRUCTURES WITH A GROUT SPLICE SLEEVE WHICH HAS A THREADED CONNECTION TO A REINFORCING BAR

[75] Inventors: Julian Albrigo; Edward D. Ricker, both of Chagrin Falls; Louis J. Colarusso, Macedonia, all of Ohio

[73] Assignee: Erico International Corporation, Solon, Ohio

[21] Appl. No.: 33,122

[22] Filed: Mar. 18, 1993

[51] Int. Cl.[5] .................... B28B 1/16; B32B 31/06; E04B 1/16

[52] U.S. Cl. .................... 264/35; 52/266; 52/726.1; 52/726.2; 52/726.3; 52/744; 52/745.2; 52/747; 264/219; 264/256; 264/261; 264/262; 264/275; 264/277

[58] Field of Search .................... 264/31-35, 264/228, 229, 333, 256, 219, 261, 262, 275, 277, 297.9, 297.1, 334; 52/726.1, 726.2, 726.3, 266, 747, 744, 745.2

[56] References Cited

U.S. PATENT DOCUMENTS

| | | | |
|---|---|---|---|
| 2,781,658 | 2/1957 | Dobell | 264/228 X |
| 3,089,215 | 5/1963 | Stubbs | 264/228 X |
| 3,107,983 | 10/1963 | Brandestini | 264/228 |
| 3,234,603 | 5/1961 | Leuthy et al. | 22/58 |
| 3,255,498 | 4/1962 | Leuthy et al. | 22/58 |
| 3,540,763 | 11/1970 | Yee | 287/108 |
| 3,632,724 | 1/1972 | Hilgeman, Jr. | 264/228 |
| 3,829,540 | 8/1974 | Cox | 264/35 X |
| 3,833,706 | 9/1974 | Edwards | 264/228 |
| 4,053,974 | 10/1977 | Howlett et al. | 264/228 X |
| 4,059,939 | 11/1977 | Elliott | 264/35 X |
| 4,095,389 | 6/1978 | Outram et al. | 52/726.1 X |
| 4,125,580 | 11/1978 | Lippert | 264/228 X |
| 4,526,739 | 7/1985 | Migliacci et al. | 264/228 |
| 4,604,250 | 8/1986 | Ecker | 264/35 |
| 4,619,096 | 10/1986 | Lancelot, III | 52/726.1 |
| 4,627,212 | 12/1986 | Yee | 52/726 |
| 4,724,639 | 2/1988 | Moser | 264/229 X |
| 4,799,307 | 1/1989 | Reigstud et al. | 264/35 X |
| 5,055,021 | 10/1991 | Bonato | 264/228 X |
| 5,196,209 | 3/1993 | Schimpff | 264/228 X |

FOREIGN PATENT DOCUMENTS

| | | | |
|---|---|---|---|
| 692174 | 8/1964 | Canada | 264/35 |
| 1442565 | 7/1976 | United Kingdom | 52/726.1 |

*Primary Examiner*—Karen Aftergut

*Attorney, Agent, or Firm*—Renner, Otto, Boisselle & Sklar

[57] ABSTRACT

To facilitate the casting of stronger and more precise steel reinforced concrete members and also to facilitate the formation and field joining of such members there is provided a bar splice which includes a generally cylindrical sleeve open at one end to form an axially elongated chamber to receive a steel reinforcing bar telescoped therein, and provided with internal threads at the other end whereby a threaded bar end may be secured to the other end, and when secured sealing the other end of the chamber. The threads are preferably tapered and the chamber includes inwardly extending axially spaced annular ribs. Lateral ports are provided at each end of the chamber. The wall thickness of the chamber adjacent the threaded end of the sleeve may be increased to improve tensile capabilities. The length of the chamber is most of the splice sleeve since the threaded connection occupies little axial space.

13 Claims, 3 Drawing Sheets

METHOD OF FORMING CONCRETE STRUCTURES WITH A GROUT SPLICE SLEEVE WHICH HAS A THREADED CONNECTION TO A REINFORCING BAR

This invention relates generally as indicated to a reinforcing splice and more particularly to a splice for steel reinforced precast concrete members and structures formed thereby, and to a method or system for using such splice to form precast members and structures.

BACKGROUND OF THE INVENTION

High tensile strength splices for reinforcing bar used in concrete construction have been widely employed. One type using a sleeve with internal deformations employs as a locking element filler metal formed from an exothermic reaction, such molten metal entering the sleeve through a tap hole. When the metal solidifies it forms a lock between the deformation on the interior of the sleeve, and the typical deformations found on the exterior of the reinforcing bar. These types of splices are sold by ERICO Inc. of Solon, Ohio under the trademark CADWELD ®. Examples of such splices may be seen in prior U.S. Pat. Nos. 3,234,603 and 3,255,498 to Leuthy et al.

Another type of reinforcing bar splice that is widely employed is a threaded splice connection. A sleeve with internal threads is threaded into a bar with external threads. One such system which is widely employed and frequently specified is a taper thread system such as that made and sold by ERICO Inc. of Solon, Ohio under the trademark LENTON ®.

While each of the above systems may be used to join or extend concrete members already cast, such as in hand holes, pockets, or with dowels or rods projecting from already cast members, such connections are difficult to make since both concrete elements have to be firmly held or supported with respect to each other while the connection is made, and a threaded connection always requires the sleeve or bar to rotate axially and to be tightened to a required torque. Additional concrete then has to be cast around the splice to form the completed structures.

Also, precast members are frequently joined by arc welding steel embedments. However, arc welding requires the parts to be firmly supported and produces heat which may cause damage to the surrounding concrete.

With an improved splicing system steel reinforced precast members could more readily be made and assembled. One attempt at such a splice system is something similar to the grout splice system shown in Yee U.S. Pat. Nos. 3,540,763 and 4,672,212. These patents use a sleeve with internal deformations and a volume stable grout to form a locking element within the sleeve locking on the internal deformations of the bar, much like the metal of the earlier Leuthy et al patents.

When used in forming precast members a splice sleeve and rod is positioned in a form to be cast and the sleeve has to be sealed at the rod end and at the open mouth into which the rod from an adjoining member will project. If it is not properly sealed, concrete when cast will enter the sleeve requiring subsequent time consuming clean out and, since it may not be cleaned out perfectly, lessening the effectiveness of the splice. Moreover, because the sleeve is not connected to the rod and the rod and sleeve are held together only by a boot or seal, and/or external supports such as chairs, the rod and sleeve can easily sag or become misaligned so that two precast elements won't properly fit together and in any event making any joint formed less effective. It would accordingly be desirable to have a grout splice system where the sleeve is readily joined to the rod and becomes an aligned tensile and compression extension thereof, while at the same time sealing the end of the grout receiving sleeve away from the casting form forming the end of the precast member. In this manner stronger precast members could more readily be formed or cast, and also assembled in the field.

SUMMARY OF THE INVENTION

To facilitate the casting of stronger and more precise steel reinforced concrete members and also to facilitate the formation and field joining of such members there is provided a bar splice which comprises a generally cylindrical sleeve open at one end to form an axially elongated chamber to receive a steel reinforcing bar telescoped therein, and provided with internal threads at the other end whereby a threaded bar end may be secured to the other end, and when secured sealing the other end of the chamber. The threads are preferably tapered and the chamber includes inwardly extending axially spaced annular ribs. Lateral ports are provided at each end of the chamber. The wall thickness of the chamber adjacent the threaded end of the sleeve may be increased to improve tensile capabilities. The length of the chamber is most of the splice sleeve since the threaded connection occupies little axial space.

A structural member is formed by placing in an appropriate form one or more steel reinforcing rods with the splice sleeve secured to threaded ends thereof such that the open end or mouth of the chamber of each sleeve abuts a form wall, to seal the mouth of the chamber, the threaded rod sealing the opposite end. The unthreaded end of the rods may project from another wall such as the opposite wall of the form a distance approximately equal to the axial length of the sleeve chambers. Since each rod and sleeve is threadedly connected, they may be handled and positioned more easily as a single unit without the sleeve sagging or becoming misaligned. With the steel properly in place the concrete is cast, partially cured and the forms removed. The concrete member then has the exposed chamber mouth at one end or side with the bar or a continuation of the bar projecting from another end or side. Two such parts may then be assembled with the projecting bar ends telescoping into the exposed chambers and grouted in place. The grout may be poured in through the mouth or pumped in through the lateral ports. If the latter are used, plastic tubes exposed to the adjoining form wall are positioned in the form. If they are not used the ports or tubes are plugged.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
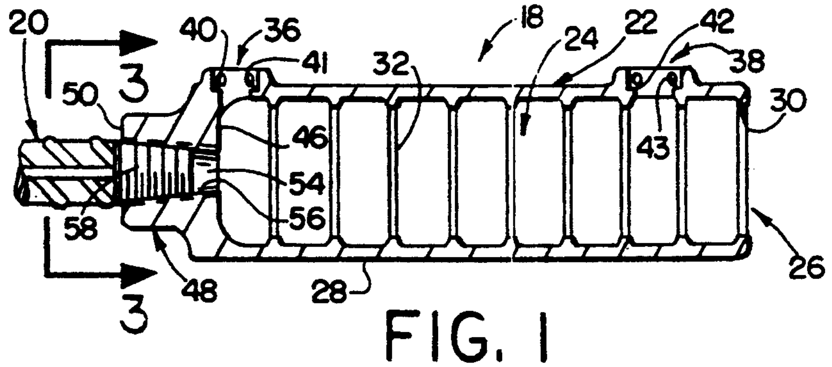
FIG. 1 is an axial section of one form of reinforcing bar splice in accordance with the present invention.

Referring initially to FIG. 1, there is illustrated a splice shown generally at 18 which comprises a steel reinforcing rod 20 and a sleeve 22. The majority of the sleeve is a cylindrical enlarged chamber shown generally at 24 which terminates at one end of the sleeve in open mouth 26.

The chamber 24 is formed by a cylindrical wall 28 and projecting inwardly from the wall 28 at the mouth is an annular constriction 30 which is of the same inward extent as equally axially spaced annular ribs 32. Excluding the constriction at the mouth, there are eight such inwardly directed ribs in the FIG. 1 embodiment.

Extending laterally through the wall of the chamber 24, are two ports indicated at 36 and 38. The port 36 may, for example, be ½" pipe size while the port 38 is ¾" pipe size. Each port is provided with chordal projections as seen at 40 and 41 for the port 36 and 42 and 43 for the port 38. The port 38 is positioned near the open mouth 26 while the port 36 is positioned adjacent the end wall 46 forming the end or the bottom of chamber 24.

Beyond the wall 46 and the port 36, the exterior of the sleeve reduces in diameter and forms a smaller yet heavier walled section 48 which terminates in end wall 50.

Figure 3:
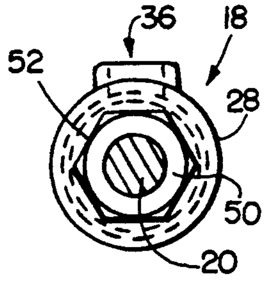
FIG. 3 is a transverse section taken on the line 3—3 of FIG. 1 illustrating the hexagonal configuration on the interior of the short threaded section.

As indicated in FIG. 3, the exterior of the shorter section 48 is provided with external hexagonal flats 52 which enables that section of the sleeve readily to be gripped by a wrench. Between the walls 46 and 50 there is provided a tapered through-hole 54 which is in turn internally threaded as indicated at 56. The threads 56 match the external tapered threads 58 on the end of the reinforcing rod 20. The tapered threaded hole is axially aligned with the sleeve and, of course, the enlarged open mouth chamber 24. The sleeve and rod may then readily be joined simply by threading the sleeve on the end of the rod and tightening the sleeve as required. In this manner the sleeve becomes a tensile and compression extension of the rod. When the sleeve is properly tightened on the rod, the end of the chamber 24 away from the mouth 26 is then sealed.

Figure 2:
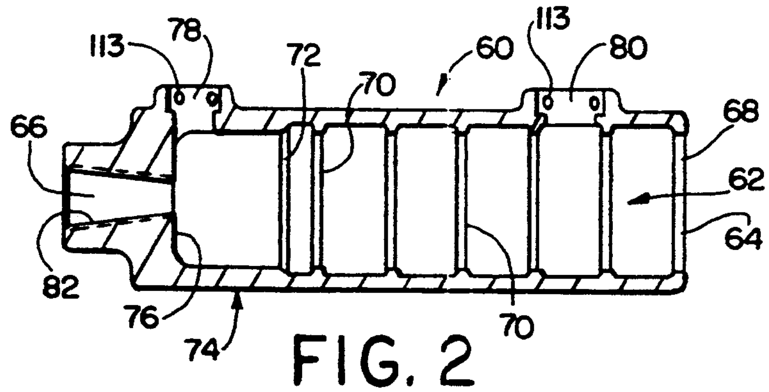
FIG. 2 is a similar axial section of another form of reinforcing bar splice having an enlarged wall thickness section at the inner end of the chamber to improve tensile strength.

Referring now to FIG. 2, there is illustrated a sleeve 60 of a slightly different configuration. The majority of the sleeve forms the open mouth chamber 62 with the open mouth 64 being at one end and the threaded tapered hole 66, being at the opposite end. The mouth includes an annular constriction 68 and there are provided equally axially spaced inwardly extending annular ribs 70 which project inwardly to the same extent as the constriction 68. However, in the embodiment of FIG. 2, there are only five such ribs in addition to the constriction 68. For most of its axial length, the wall thickness of the sleeve forming the chamber 62 is of uniform dimension. However, slightly inwardly of the last or deepest rib 70, there is provided a shoulder 72 which forms an enlarged wall thickness section 74 which extends to the end wall 76 of the chamber 62. The smaller port 78 extends laterally through the section 74 of increased wall thickness. The somewhat larger lateral port 80 is provided again near the open mouth 64. The sleeve 60 in FIG. 2 may be secured to the tapered threaded end of a reinforcing rod in the same manner through the internal tapered threads 82 and when joined to the reinforcing rod, that end of the chamber 62 is sealed with respect to the rod. The sleeve of FIG. 2 has been found to have somewhat greater tensile capabilities than the sleeve seen in FIG. 1. The two embodiments of the sleeves illustrated may be formed by steel castings, which after cleaning is then tapped to form to tapered internal thread in the reduced length externally flatted end.

In forming precast structures the sleeve is designed to be filled with a volume stable high strength grout either by pouring in through the open mouth or by pumping in through the lateral ports. The manner of filling the sleeve may determine how the precast member is made.

Figure 4:
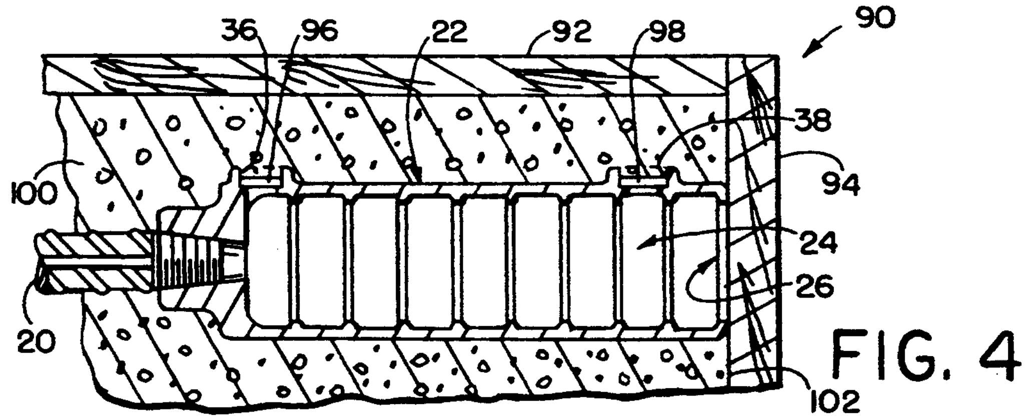
FIG. 4 is a broken section of the placement in a cast concrete form of the joined bar and sleeve with the lateral ports of the chamber plugged.

As seen in FIG. 4, the sleeve 22is joined to the reinforcing rod 20 and the splice thus formed is positioned in a casting form shown generally at 90 which may comprise a sidewall 92 and an end wall 94, as well as other walls not shown. Such forms are conventional and may be plywood, steel, or reinforced plastic and shape the steel reinforced precast concrete member being formed. The steel rod in such forms may be supported by chairs or the like in conventional fashion to be spaced from the lateral or bottom walls of the form. In FIG. 4 the sleeve and rod have been secured together and positioned in the form with the open mouth 26 abutting the interior of the end wall 94 providing a seal for such mouth. In FIG. 4, the lateral ports 36 and 38 have been sealed by snap-in plugs 96 and 98, respectively, seating on the chordal shoulders. Concrete is then cast into the form as indicated at 100 to form the steel reinforced concrete member. The chamber 24 is sealed at the mouth end by the wall 94 and at the opposite end by the rod 20. With the lateral ports also sealed, no concrete can enter the chamber 24. When the concrete is partially cured and the forms are removed, the mouth 26 will be exposed at the end wall 102 of the member formed.

Figure 5:
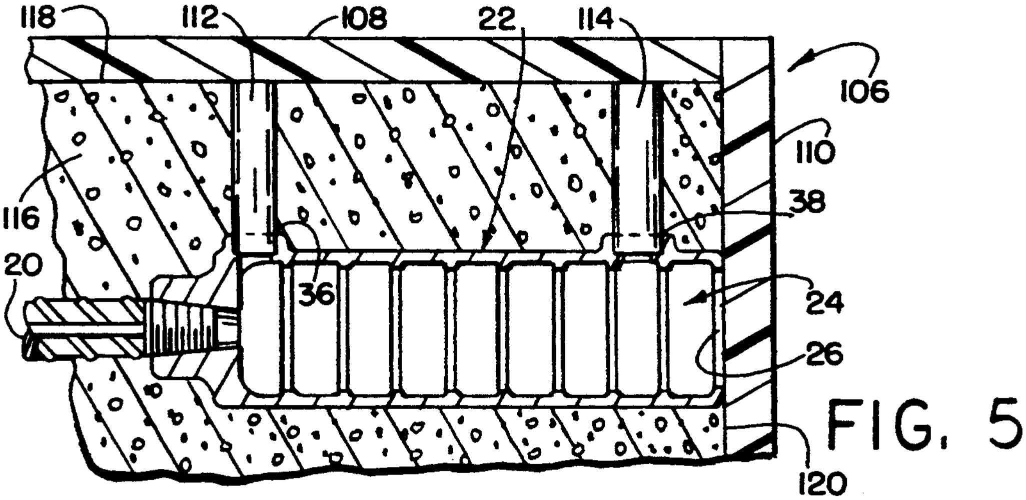
FIG. 5 is a view similar to FIG. 4 illustrating the use of plastic tubing to provide access to the ports from the exterior of the concrete.

Referring now to FIG. 5, there is illustrated the rod and sleeve joined to form the splice in a form 106 which includes lateral wall 108 and end wall 110. Extending from the ports 36 and 38, respectively, are plastic tubes or pipes 112 and 114. The inner ends of the plastic pipes are seated on the chordal shoulders of the ports while the outer ends are sealed against the interior of wall 108. When the concrete 116 is cast, the pipe or tube ends will be exposed at the lateral wall 118 of the steel reinforced concrete member while the mouth 26 of the sleeve 22 is exposed at the end wall 120.

In forming the precast concrete members, the rod 20 may project through the form wall opposite the end walls 94 and 110 to form a projecting dowel. Preferably, the projecting end of the rod forming the dowel projects a distance slightly less than the axial length of the chamber 24. For example, if a column or wall section is being formed, the steel reinforcing rod would be threadedly connected to the sleeve exposed at the top or bottom of such element while the opposite end of the rod would project a short distance from the opposite end of the element forming a connecting dowel. It will, however, be appreciated that precast concrete members may be designed in many ways to form column sections, beam sections, panel sections, sheer walls, and floor slabs, all of which may be formed in somewhat different ways. For example, the rod does not have to project out the opposite end wall of the form, but rather may be bent through 90° to project from a lateral wall to form any of a wide variety of concrete structures.

It will be appreciated that whether the member is made with plugs or tubes in the ports, both the tubes and the mouth of the sleeve may be sealed or plugged to keep dirt out of the chamber. Also, even though tubes are provided, such tubes may remain plugged and the chamber filled by gravity feed through the mouth.

Figure 6:
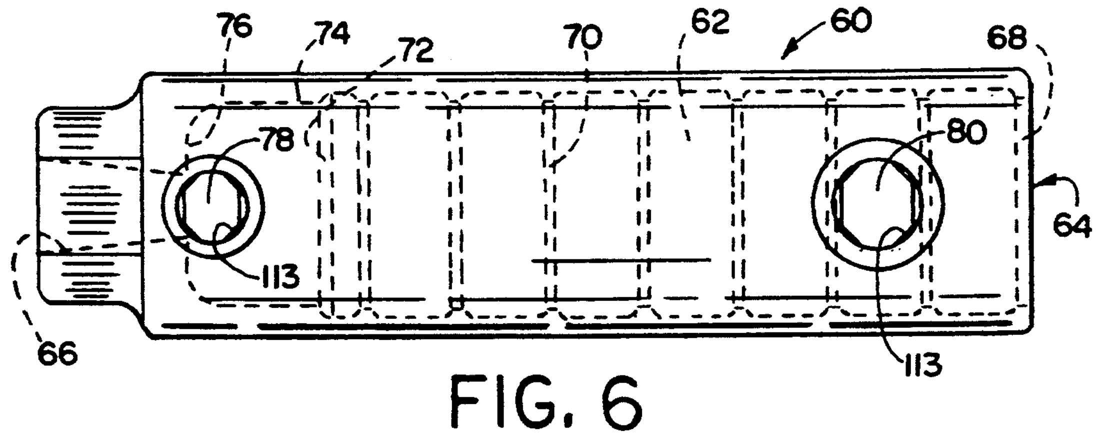
FIG. 6 is an enlarged top plan view of the sleeve of FIG. 2 showing the rounded projections in the port openings which are used to grip a plastic pipe or tube inserted therein.

With reference to FIG. 6, in addition to FIGS. 1 and 2, it will be seen that the interior axial wall of each of the ports 36 and 42, or 78 and 80 are provided with radially inwardly extending circular projections or shallow domes at 113. The shallow domes are four in number for each port which are quadrant spaced about the port wall. The domes serve to grip and hold the exterior of the plastic pipes or tubes 112 or 114 when inserted to the chordal shoulders 42 and 43.

Figure 7:
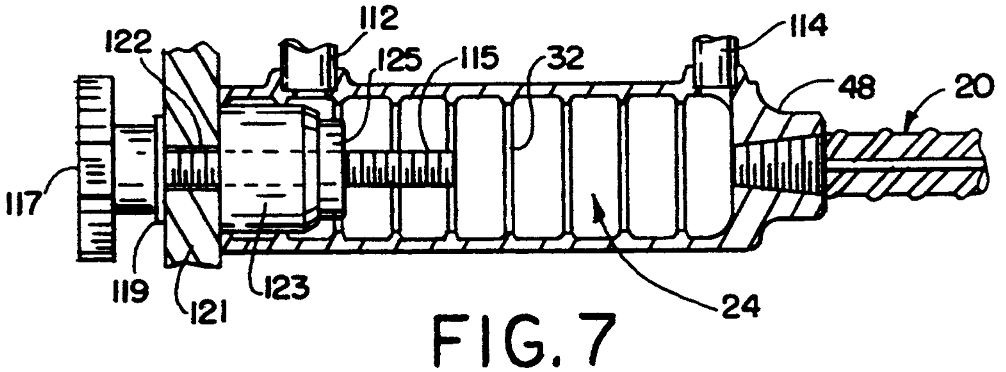
FIG. 7 is a view similar to FIG. 5 showing the use of a axially compressible grommet which may be used to align and seal the mouth of the sleeve with respect to the form wall.
Figure 8:
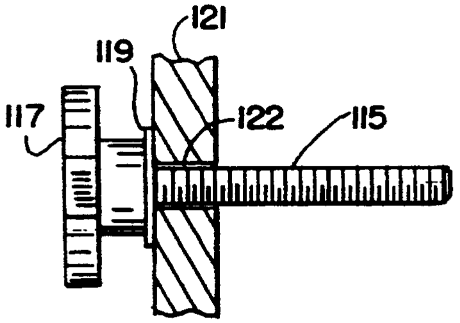
FIG. 8 illustrates an initial step in installing the compressible grommet.
Figure 9:
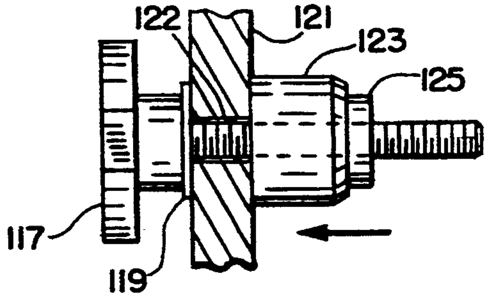
FIG. 9 shows an intermediate step in the installation finger tightening the threaded disc against the installed grommet before tightening the knob to compress the grommet.

Referring now to FIGS. 7, 8 and 9, in order properly to position the mouth of the sleeve with respect to the form, and also to seal the mouth end of the sleeve, the form attachment illustrated may be employed. The form attachment comprises a threaded rod 115 which is formed on one end with a hand knob 117 enabling the rod to be axially rotated. Adjacent the knob is a washer 119 which fits between the form 121 and the knob.

The threaded rod extends through hole 122 in the form as seen in FIG. 8. With the rod projecting inwardly of the form, the rubber grommet 123 is telescoped on the rod and then internally threaded disc 125 is finger tightened against the outer beveled end of the grommet as seen by the arrow in FIG. 9. The threaded disc may be rotated clockwise as seen from the right of FIG. 9. The sleeve is then installed over the grommet as seen in FIG. 7 and the knob is then rotated clockwise as seen from the left side of FIGS. 7, 8 and 9. This draws the washer to the left as seen in such Figures axially compressing the grommet causing it to bulge radially outwardly both centering the sleeve with respect to the hole and sealing the mouth of the sleeve with respect to the interior of the form.

Figure 10:
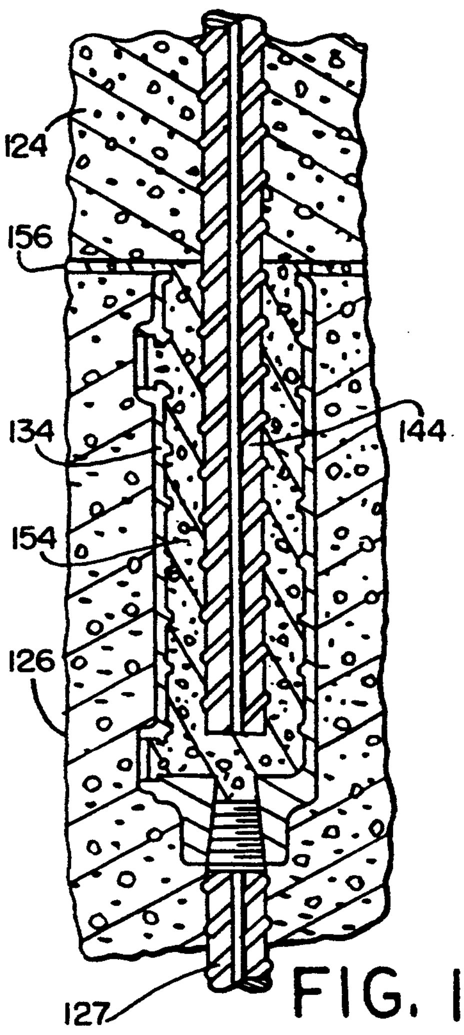
FIG. 10 is an axial section of two precast members joined with the rod or dowel from one projecting into the chamber of the splice and grouted in place.
Figure 11:
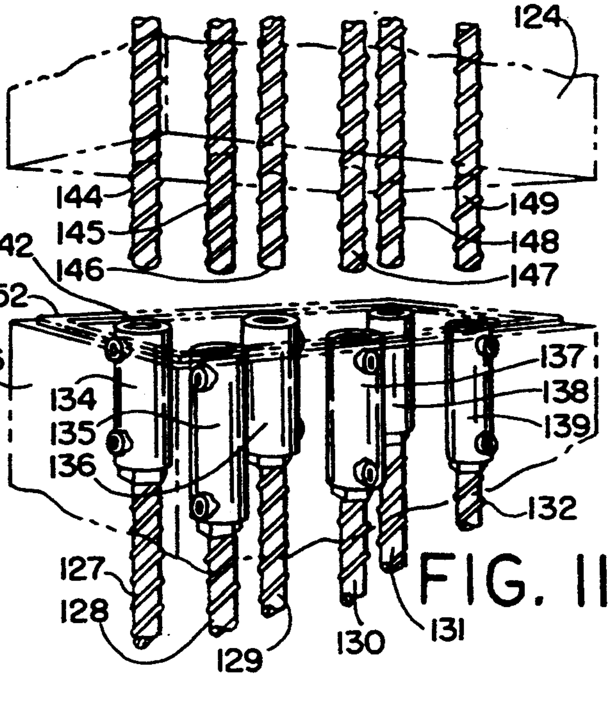
FIG. 11 illustrates two precast members being joined with a gravity feed.

Referring now to FIGS. 10 and 11, there is illustrated a typical gravity feed connection between two vertically oriented precast members 124 and 126. Each member is formed with vertically extending steel reinforcing rods which are vertically aligned as indicated at 127, 128, 129, 130, 131 and 132 for the element 126, each of which has a sleeve threaded to the top thereof as indicated at 134, 135, 136, 137, 138, and 139, respectively. The lateral ports of each sleeve are plugged and the mouth of each sleeve is exposed at the top of the member as indicated at 142.

The bottom end of the member 124 simply has the reinforcing rod projecting a short distance from the bottom thereof as indicated at 144, 145, 146, 147, 148 and 149. Such rods are aligned with the rods and sleeves of the member 126.

To form the connection the member 124 is supported in the separated position illustrated and ring of sealing mortar is provided on the top wall of the member 126 as indicated at 152. The volume stable grout is then simply poured into the interior of the sealing mortar and allowed to at least partially fill the chambers of the splices through the exposed mouths. Normally, more grout than is necessary will be employed. With the grout in place, the upper element 124 is then lowered causing the projecting rods to telescope into the open mouths of the exposed sleeves as indicated in FIG. 10. As indicated, the grout 154 within the sleeve 134 will be displaced by the rod end 144 extending into the open mouth of the sleeve and sufficient grout will extrude outwardly as indicated at 156 filling the area in the sealing mortar and any excess will extrude outwardly. The upper member 124 will be held in proper place and in plumb position until the grout has sufficiently cured so that support can be released.

Figure 12:
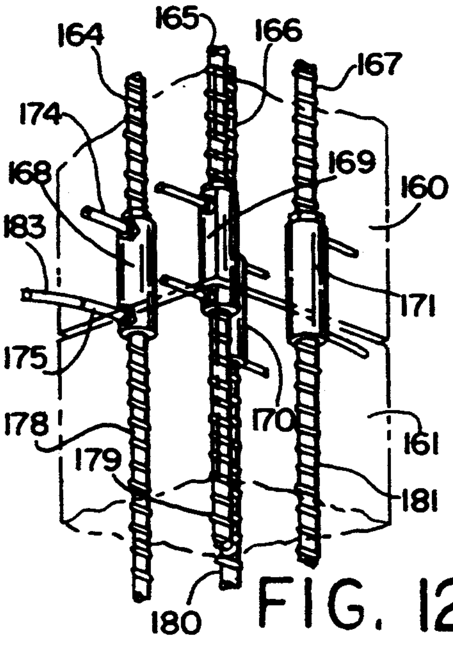
FIG. 12 illustrates a pump feed in a column-to-column connection.

Referring now to FIG. 12, there is illustrated two column sections. The upper column section has four steel reinforcing rods indicated at 164, 165, 166, and 167 threadedly connected to sleeves 168, 169, 170 and 171, respectively. The mouths of the sleeves are exposed at the bottom of the column section. Exposed at the lateral wall, for each sleeve, are the laterally extending plastic pipes or tubes seen at 174 and 175. The bottom column section includes four rods seen at 178, 179, 180 and 181 which project a short distance from the top of that column section. The grout may be pumped into each sleeve through the bottom port by the pump feed indicated at 183 in turn filling each sleeve with grout through the larger lower port. The smaller upper port creates a back pressure insuring that the sleeve is properly filled with grout.

Figure 13:
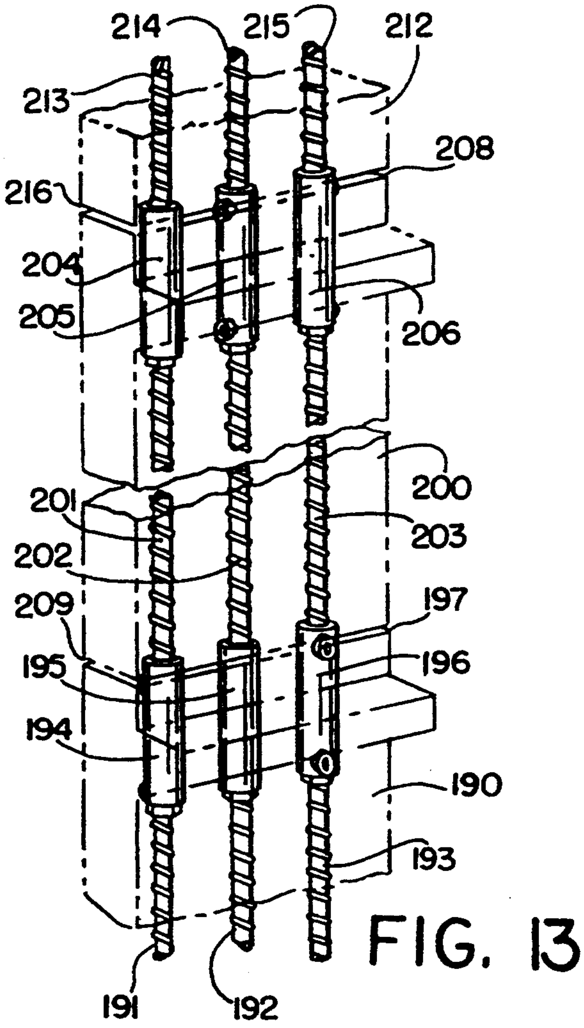
FIG. 13 illustrates a wall-to-wall connection.

In FIG. 13, there is illustrated three wall elements joined together with the splice of the present invention. The lower wall element 190 has three reinforcing rods 191, 192, and 193 threadedly connected to sleeves 194, 195, and 196, respectively with the mouths of the chambers of such sleeves exposed at the top 197 of such wall element. Similarly, the wall element 200 has three reinforcing rods 201, 202, and 203 which are threadedly connected to sleeves 204, 205, and 206, respectively. The mouths of the sleeves are exposed at the top 208 of the wall section 200 while the lower ends of such rods project a short distance from the bottom 209 of such wall section. The third or too wall section 212 also has three reinforcing rods 213, 214, and 215, which project from the bottom of such wall section 216. The rods and sleeves of each wall section are vertically aligned. Using the same technique as described in connection with FIGS. 10 and 11, the wall sections can be connected on top of each other. They may readily be connected using either the pour or pump technique described.

As can be seen, the high strength threaded connection between the rod and sleeve, occupies only a small portion of the axial length of the splice. The axially elongated chamber into which the projecting bar dowel telescopes forms the majority of the splice. For example, the overall length of the sleeve is from about 1.1 to about 1.4× the length of the axially elongated chamber. Preferably, the length of the chamber is from about 0.75 to about 0.90× the overall length of the sleeve. The splice sleeve is accordingly considerably shorter than a conventional grout splice and requires considerably less grout filling material. The tapered thread connection provides ease of assembly at the casting yard and enables the bar and splice to act as unit making the steel reinforcing easier to place and align in the form. The strong rigid connection between the bar and the sleeve makes placement and alignment easier, and the connection insures the sealing of the axially elongated chamber at the end away from the mouth.

The splice and system of the present invention meets or exceeds 125% of the specified yield in both tension and compression applications for the applicable reinforcing bar. For example, for grade 60 rebar, this would convert to a minimum tensile strength of 75,000 psi.

With the present invention, the design and application of precast concrete members and structures formed thereby is essentially limitless. The system can be used, for example, to form column-to-column connections, beam-to-column connections, beam-to-beam connections, panel-to-panel connections, columns-to-foundation connections, sheer walls or wall-to-floor slab connections.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

We claim:

1. A method of forming concrete structures comprising the steps of forming steel reinforced cast concrete structural members by constructing a form for each said member placing in each said form a steel reinforcing rod, said rod terminating in a threaded end near a form wall and having secured to said threaded end a splice sleeve, said splice sleeve including a threaded section at a first end connected to said threaded end of said rod, and a second end of said splice sleeve including an enlarged generally cylindrical chamber having an open mouth adapted to receive another rod end for grout splicing therein, said chamber being axially aligned with said threaded section of said sleeve and said threaded end of said rod whereby when said sleeve is secured to said rod said sleeve and rod end become aligned tensile and compression extensions of each other positioning said rod and sleeve such that said open mouth is in engagement with said form wall whereby said chamber is sealed between said form wall and said threaded section of said sleeve, and then casting concrete in each said form to form said steel reinforced structural members with said mouth of each said chamber being exposed by removal of each said form, and then joining said members by grout splicing to form said structures.

2. A method as set forth in claim 1 wherein said mouth of said sleeve includes an inwardly constricting edge.

3. A method as set forth in claim 2 wherein said chamber includes a series of inwardly directed axially spaced ribs, and said joining of said members includes inserting said rod from one concrete structural member into said exposed mouth of an adjacent concrete structural member such that said rod is substantially axially coextensive with said chamber, and then inserting into said chamber a hardenable material to lock said structural members together to form said concrete structures.

4. A method as set forth in claim 3 wherein said hardenable material is introduced through said mouth of said chamber.

5. A method as set forth in claim 3 wherein said chamber includes lateral ports at each axial end, and said hardenable material is introduced through one of said ports.

6. A method as set forth in claim 5 wherein said hardenable material is a pumpable volume stable grout.

7. A method as set forth in claim 6 wherein said concrete structural members are vertically oriented and said grout is pumped through a lower one said ports.

8. A method of forming steel reinforced cast concrete structures comprising the steps of casting in a form steel reinforced elements with steel reinforcing rod extending therethrough, said steel rod projecting from one end of said steel reinforced elements a short distance and terminating at an opposite end in an axially elongated exposed open mouth sleeve, said sleeve being threaded to said rod so that said sleeve and rod are aligned tensile and compression extensions of each other, whereby said concrete structures are formed by joining adjacent ones of said cast steel reinforced elements with said rod projecting from one end of one element telescoping into said sleeve at said opposite end of an adjacent element, and said telescoping rod and sleeve of adjacent elements being grout spliced together.

9. A method as set forth in claim 8 wherein said adjoining adjacent elements are vertically oriented, and said sleeves are filled with grout through said open mouth, when said mouth opens upwardly.

10. A method as set forth in claim 8 wherein said open mouth sleeve includes lateral ports at each axial end of said sleeve, and said sleeve is filled with grout by pumping through a lower one of said ports.

11. A method as set forth in claim 8 wherein said open mouth sleeve includes lateral ports at each axial end, one larger than the other, and said sleeve is filled with grout by pumping through said larger one of said ports.

12. A method as set forth in claim 8 including the step of taper threading said sleeve and rod, whereby said sleeve and rod are assembled by relative rotation, and when assembled said rod forms an internal seal for an end of said sleeve opposite said open mouth.

13. A method as set forth in claim 8 including the step of aligning and sealing said open mouth of said sleeve with respect to said form before concrete is cast into said form.

* * * * *